United States Patent [19]

Hiroyoshi et al.

[11] Patent Number: 5,054,017
[45] Date of Patent: Oct. 1, 1991

[54] OPTICAL INFORMATION REPRODUCING APPARATUS

[75] Inventors: Jun Hiroyoshi, Moriguchi; Yuzuru Kuroki, Sapporo; Isao Satoh, Neyagawa, all of Japan

[73] Assignee: Matsushita Electric Industrial Co., Ltd., Osaka, Japan

[21] Appl. No.: 501,105

[22] Filed: Mar. 29, 1990

[30] Foreign Application Priority Data

Mar. 29, 1989 [JP] Japan .................................. 1-78856

[51] Int. Cl.$^5$ ...................... G11B 20/10; G11B 20/12; G06F 11/00; G06K 5/04
[52] U.S. Cl. .................................. 369/275.1; 369/47; 369/58; 371/57.2; 371/65
[58] Field of Search ................. 360/53; 371/57.1, 57.2, 371/52, 65; 369/275.1, 275.5, 58, 54, 53, 48, 47

[56] References Cited

U.S. PATENT DOCUMENTS

| 4,835,758 | 5/1989 | Fujishima | 369/58 |
| 4,888,780 | 12/1989 | Imazu | 371/57.2 |

FOREIGN PATENT DOCUMENTS

| 0027451 | 2/1983 | Japan | 371/65 |
| 0126264 | 7/1984 | Japan | 369/58 |
| 0185035 | 10/1984 | Japan | 369/47 |
| 2217095 | 10/1989 | United Kingdom | 371/65 |

Primary Examiner—Stuart S. Levy
Assistant Examiner—John Pokotylo
Attorney, Agent, or Firm—Wenderoth, Lind & Ponack

[57] ABSTRACT

In the reproduction of data from one of N-frame sectors of an optical disk, data marks representing the front ends of the respective frames of a desired sector are detected and counted. When the number of the data marks is more than a predetermined value M ($1 < M \leq N$), the reproduced data is accepted. Hence, the data accuracy can be ensured and the operating reliability of a data reproducing apparatus can be improved.

1 Claim, 3 Drawing Sheets

FIG. 5(b) SECTOR MARK 4

FIG. 5(c) DEMODULATION INSTRUCTION SIGNAL 25

FIG. 5(d) DATA MARK DETECTION SIGNAL 23

FIG. 5(e) DEMODULATION GATE SIGNAL 26

FIG. 5(f) DEMODULATION COMPLETION SIGNAL 29

FIG. 5(g) DEMODULATED DATA 28

FIG. 5(h) DM COUNT 30

FIG. 5(i) DEMODULATION VALIDATION SIGNAL 36

OPTICAL INFORMATION REPRODUCING APPARATUS

BACKGROUND OF THE INVENTION

1. Field of the Invention

The present invention relates to an optical information reproducing apparatus for reproduction of data recorded in sectors of a recording medium.

2. Description of the Prior Art

FIG. 1 is an external front view of a known optical disk. The optical disk denoted by the numeral 1 is provided with guide tracks 2 formed thereon in a spiral or concentric arrangement for optical detection and for serving as a guiding path(s), whereby the recording tracks are arranged at high density and discrete writing and erasing of fragments of data can be ensured. The recording is carried out by forming pits or providing variations in reflectivity or transmittance using a laser beam of less than 1 μm in diameter directed to a recording layer provided on the guide track 2.

For recording a variable length digital information data, the track is separated into a plurality of sectors to enhance the recording efficiency, allowing the data to be recorded and reproduced on a sector by sector basis.

FIG. 2 shows a graphic representation of a sector. Each sector comprises an ID field 4 containing track and sector address information and a data field 5 for the recording and reproducing of data.

A data format of the data field 5 is shown in FIG. 3. The data field 5 comprises a pull-in signal 6 for pulling in with a phase locked loop, marks 7 for identification of the leading ends of data (which will be referred to as data marks hereinafter), and segments of data 8. For demodulation of the data, one of the data marks 7 is detected from a reproduced signal to produce an enable signal which announces the presence or absence of data. The enable signal is then examined to determine whether it is active or non-active, for thereby determining whether the data has been demodulated, and also, for verifying the end of demodulation.

On the other hand, if there is any flaw, dust, or damage on the substrate, recording layer, or protective layer of the optical disk, the reproduced signal induces drop-out. Since both the size of each recording pit and the track pitch on the optical disk are as small as about 1 μm, the rate of actual operational error is practically not less than a range between $10^{-4}$ and $10^{-5}$ and also, the drop-out of the reproduction signal will occur at random or in an extensive burst-like form.

Additionally, the recording layer of the optical disk is intended to involve a limited number of recording operations and will gradually experience an increase in the actual error rate before finally becoming unusable for demodulation.

When examining whether a given sector is recorded or when retrieving an unrecorded sector, the leader of the data must be detected. When it is found out that a corresponding demodulation circuit remains inactivated, the sector is judge unrecorded. However, if a data mark of a data block in a sector is lost due to a drop-out and the data in the data block contains the same bit pattern as the data mark bit pattern, such a bit pattern in the data would be erroneously detected as a data mark. Also, if a drop-out exists near a data mark in a sector in an adjacent track, the data mark in the adjacent rack would be erroneously detected due to crosstalk. Such erroneous data mark detection will cause the corresponding demodulation circuit to be activated to inadvertently demodulate the data in the sector defected due to drop-out.

It is also understood that a known rewritable optical disk experience an increase in operational error due to the fatigue of its recording layer after a particular number of recording operations. Although a corresponding demodulation circuit identifies a demodulation error such as bias demodulation, it cannot detect any sign of deterioration in the data. Accordingly, erroneous data will be demodulated for reproduction, or the error cannot be corrected when surpassing its limit.

SUMMARY OF THE INVENTION

It is a primary object of the present invention to provide an optical information reproducing apparatus adapted to improve its operational reliability and ensure the effectiveness of data to be demodulated by determining whether a corresponding circuit is turned on according to a normal procedure or a detection fault while detecting a data mark of the data.

To accomplish the above object, the optical information reproducing apparatus according to the present invention is arranged for reproduction of data, the data in each sector being divided into an N-number ($N \geq 2$) of blocks (which will a data mark provided in the front end thereof for identifying the leading end of data, in which the data marks in a reproduced signal of a desired sector are identified for reproduction of the data in their associated blocks and when the number of the data marks is more than a predetermined value M ($1 < M \leq N$), the data reproduced is accepted. The value M may arbitrarily be determined for presetting, depending on the number and state of drop-out failures on an optical disk to be detected.

In the operation of reproducing recorded data from a given sector and particularly, retrieving a non-recorded sector having N frames, if an error data mark is detected due to the effect of drop-out existing on an optical disk causing a corresponding reproduction circuit to start operating, the number of the data marks provided in the front ends of their respective frames is read and counted. When the number is greater than M ($1 < M \leq N$), the data in data fields of the sector is accepted. This allows the determining of whether or not the demodulation circuit is normally activated, whereby the effectiveness of data will be ensured and the operating reliability of the apparatus will be improved.

BRIEF DESCRIPTION OF THE DRAWINGS

FIGS. 5a–5i are timing charts of demodulation of data.

DESCRIPTION OF THE PREFERRED EMBODIMENT

Figure 1:
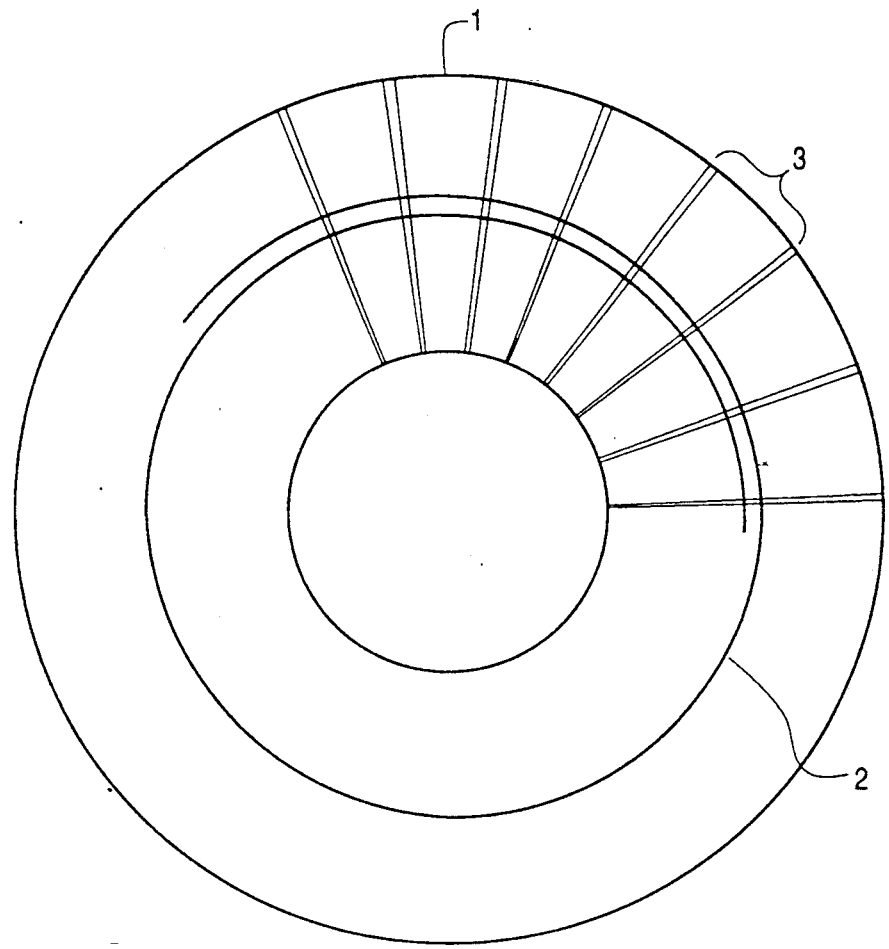
FIG. 1 is an external front view of a conventional optical disk.
Figure 2:
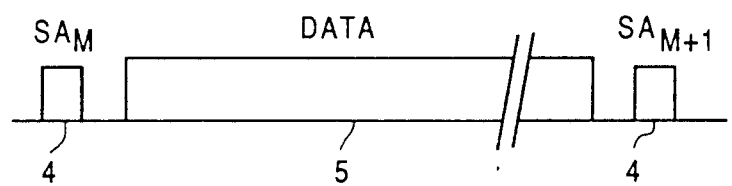
FIG. 2 is a diagram showing a sector on the optical disk of FIG. 1.
Figure 3:
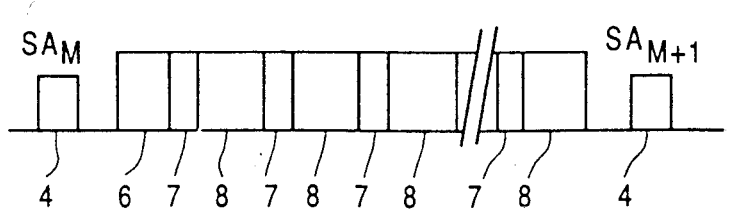
FIG. 3 is a diagram showing a conventional recording format of the sector composed of frames.
Figure 4:
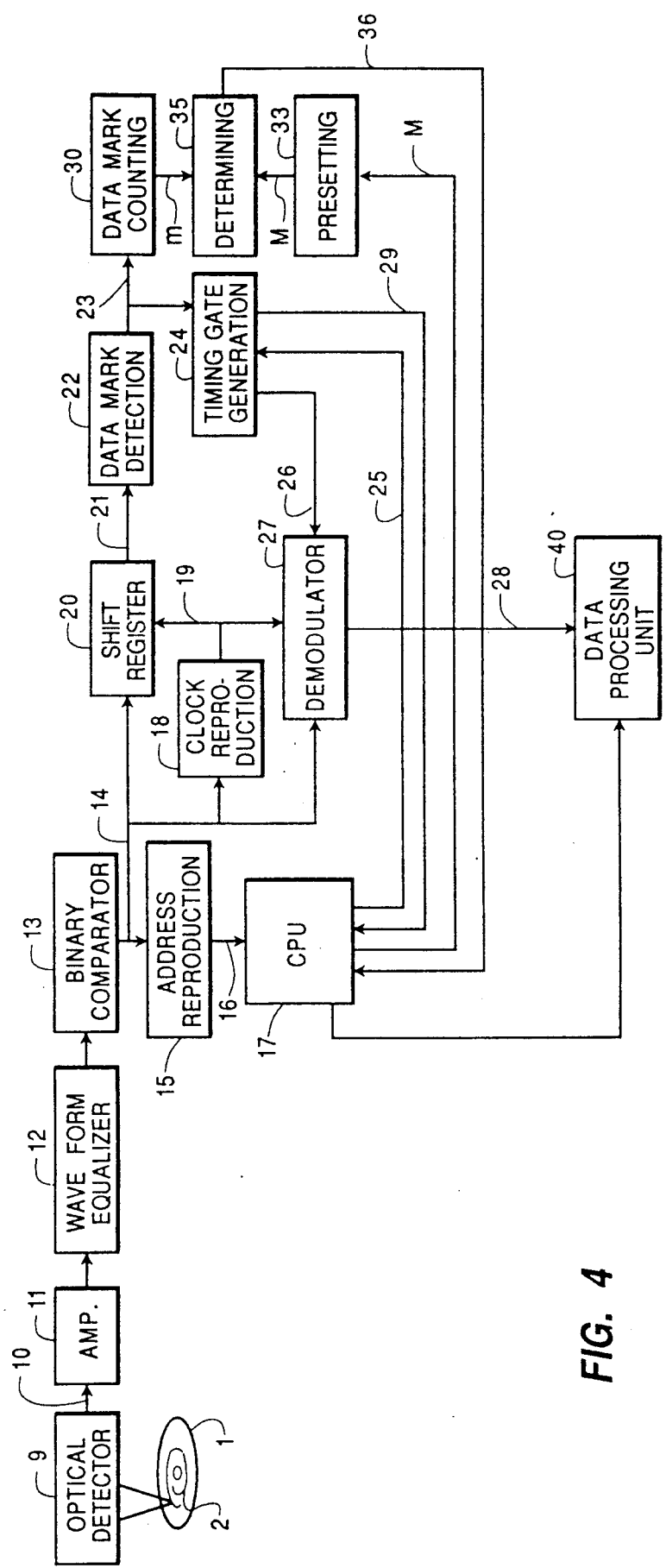
FIG. 4 is a block diagram showing an embodiment of the present invention in the form of an optical information reproducing apparatus.
Figure 5A:
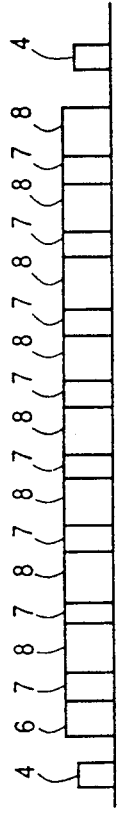
Figure 5A:
Figure 5A:
Figure 5A:
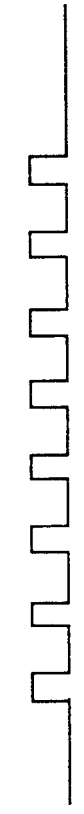
Figure 5A:
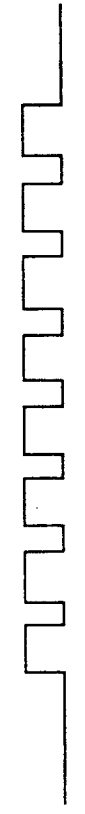
Figure 5A:
Figure 5A:
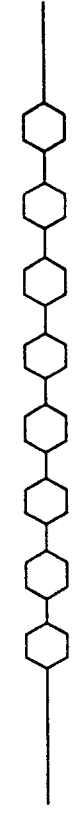
Figure 5A:
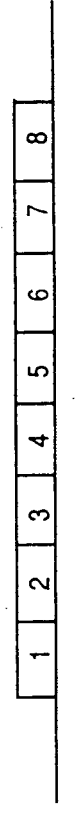
Figure 5A:

A preferred embodiment of the present invention will be described in detail referring to the accompanying drawings. FIG. 4 is a block diagram showing an optical information reproducing apparatus according to the present invention, in which the numeral 9 denotes an optical detector for reproduction of data from an optical disk 1, numeral 11 denotes an amplifier for amplifying a reproduced signal 10, numeral 12 denotes a waveform equalizer, numeral 13 denotes a binary comparator for binarizing or digitizing the reproduced signal, numeral 15 denotes an address reproduction circuit for read-out of the address of an ID field section, numeral 17 denotes a central processing unit (CPU), numeral 18 denotes a clock reproduction circuit for read-out of a reproduced signal 14 which has been binarized, numeral 20 denotes a shift register for shifting the binarized reproduced signal 14 from serial to parallel form, numeral 21 denotes a parallel data output produced by the shift register 20, numeral 22 denotes a data mark detection circuit for detection of a data mark pattern, numeral 24 denotes a timing gate generation circuit for control of the execution of demodulation, numeral 27 denotes a demodulation circuit for demodulating the reproduced signal, numeral 30 denotes a data mark counting circuit for counting the number of data marks detected from the reproduced signal, numeral 33 denotes a presetting circuit for setting a specific number of data marks, and numeral 35 denotes a determining circuit for comparing a presetting value with an output from the data mark count circuit 30.

Data recorded in one of the sectors 3 along a guide track 2 of the optical disk 1 is read by the optical detector 9 for reproduction. A reproduced signal 10 of the data is amplified by the amplifier 11 and waveform shaped using the waveform equalizer 12. The reproduced signal passed through the waveform equalizer 12 is then binarized by the binary comparator 13 to produce a binarized, or digital, reproduced signal 14. The address of an ID field section of the sector is read by the address reproduction circuit 15 so as to output a sector address reproduction signal 16. For retrieval of data from a desired sector, the CPU 17 supplies a demodulation instruction signal 25 to the timing gate generation circuit 24 upon receiving such an address reproduction signal 16 for the desired sector. Also, the shift register 20 performs shift operation in sequence according to a clock signal 19 extracted from the binarized reproduction signal 14 by the clock reproduction circuit 18. The binarized reproduction signal 14 is thus shifted by the shift register 20 from serial to parallel form, i.e. to a parallel data output 21 which is in turn transmitted to the data mark detection circuit 22. The data mark detection circuit 22, when detecting the data mark bit pattern from the parallel data output 21, generates a data mark detection signal 23. In response to the data mark detection signal 23, the timing gate generation circuit 24 outputs a demodulation gate signal 26 to the demodulation circuit 27. Then, the demodulation circuit 27 commences demodulation of the binarized reproduction signal 14 to produce a demodulated data output 28 which will be transmitted further to a data processing unit 40.

In addition, a presetting datum having a value of M is provided by the CPU 17 to a preset circuit 33 which in turn transfers the value of M to the determining circuit 35. On the other hand, the number of data marks in the data mark detection signal 23 detected by the data mark detection circuit 22 is counted by the data mark counting circuit 30 and a resultant value of m is sent to the determining circuit 35. The two values of M and m are then compared in the determining circuit 35. As the result of such comparison, when m calculated from the counting of the data mark detection signal 23 with the data mark counting circuit 30 is equal to or greater the preset value than M, a data demodulation validation signal 36 is delivered to the CPU 17 which acts as a controller, informing that the desired sector is furnished with recorded data and also, demodulation of the data is normally being carried out. The CPU 17 then controls the data processing unit 40 according to the determination as whether or not demodulation is normally executed.

FIGS. 5a–5i are timing charts showing the demodulation of data. When the address information of a sector mark 4 preformatted is identified, the CPU 17 transmits a demodulation instruction signal 25 to the timing gate generating circuit 24. Also, upon detecting the data mark, the data mark detection circuit 22 outputs a data mark detection signal 23. Then, the timing gate generating circuit 24 produces a demodulation gate signal 26 to enable the demodulation circuit 27. Only when the demodulation data signal 26 is active, the demodulation circuit 27 performs demodulation to produce a demodulated data output 28. The timing data generating circuit 27 transmits a demodulation completion signal 29 to the CPU 17 when having finished the demodulation of data of the final frame through counting the number of frames using a counter. The CPU 17 upon receiving the demodulation completion signal 29, shifts the demodulation instruction signal to non-active for terminating the demodulation. Also, during the demodulation, data marks are detected from the binarized reproduction signal by the data mark detection circuit 22 and the number of data mark patterns is counted by the data mark counting circuit 30. A resultant number m is then compared with the presetting value M. If m≧M, a data demodulation validation signal 36 is generated to be output.

As shown in FIG. 5, the number of the frames in the sector is 8, i.e. N=8, while the presetting value M is 6. Hence, when the number of detected data marks is more than 6, i.e. m>6, the demodulation validation signal 36 becomes active. M may be determined according to the number of frames and the error correction capability.

What is claimed is:

1. An optical information reproducing apparatus for reproducing data recorded on an optical recording medium, the optical recording medium having formed thereon a plurality of tracks, each of the plurality of tracks being divided into a plurality of sectors, each of the plurality of sectors having N data blocks in which data are recorded, and where N≧2, each of the N data blocks having a data mark at a leading portion thereof, said apparatus comprising:

reproducing means for reproducing the data recorded on the recording medium;

data mark detecting means for detecting each data mark of the data reproduced by said reproducing means;

counting means for counting the number of data marks detected by said data mark means, said counting means having a count value in accordance with the number of data marks thus counted;

demodulating means for demodulating the data reproduced by said reproducing means to obtain a demodulated data; and means responsive to the count value of said counting means for invalidating the demodulated data when the count value obtained from the data reproduced for each sector is smaller than a predetermined value M, where $1 < M \leq N$.

* * * * *